US012101403B2

(12) United States Patent
Fan (10) Patent No.: US 12,101,403 B2
(45) Date of Patent: Sep. 24, 2024

(54) INTERLEAVED SCALAR MULTIPLICATION FOR ELLIPTIC CURVE CRYPTOGRAPHY

(71) Applicant: Tencent America LLC, Palo Alto, CA (US)

(72) Inventor: Xuelei Fan, Brentwood, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 210 days.

(21) Appl. No.: 17/973,696

(22) Filed: Oct. 26, 2022

(65) Prior Publication Data

US 2024/0146529 A1    May 2, 2024

(51) Int. Cl.
*H04L 9/30* (2006.01)
*G06F 7/72* (2006.01)

(52) U.S. Cl.
CPC ............ *H04L 9/3066* (2013.01); *G06F 7/725* (2013.01)

(58) Field of Classification Search
CPC ................................ H04L 9/3066; G06F 7/725
See application file for complete search history.

(56) References Cited

U.S. PATENT DOCUMENTS

| | | | |
|---|---|---|---|
| 5,737,609 | A | 4/1998 | Reed et al. |
| 2003/0142820 | A1 | 7/2003 | Futa et al. |
| 2004/0117771 | A1 | 6/2004 | Venkatapathy |
| 2007/0244944 | A1 | 10/2007 | Bertoni et al. |
| 2008/0028373 | A1 | 1/2008 | Yang et al. |
| 2008/0095357 | A1 | 4/2008 | Kitamura et al. |
| 2010/0040225 | A1 | 2/2010 | Venelli et al. |
| 2011/0075836 | A1* | 3/2011 | Yamamoto .............. G06F 7/725 380/28 |
| 2011/0296375 | A1 | 12/2011 | Mooney |
| 2012/0114117 | A1 | 5/2012 | Ebeid |
| 2013/0218937 | A1 | 8/2013 | Naito et al. |
| 2017/0187530 | A1* | 6/2017 | Ghosh ....................... G09C 1/00 |
| 2020/0264843 | A1* | 8/2020 | Schwarz ................. G06F 7/725 |

OTHER PUBLICATIONS

International Search Report and Written Opinion for priority application No. PCT/US23/065773 dated Jul. 25, 2023, 25p.
ECMA International, Standard ECMA-262, ECMAScript 2021 Language Specification, 12$^{th}$ Edition. Jun. 2021, pp. 47-52, pp. 389-428, CH.

(Continued)

*Primary Examiner* — Frantz B Jean
(74) *Attorney, Agent, or Firm* — Crowell & Moring LLP (57) ABSTRACT

Methods, apparatus, and computer readable storage medium for performing interleaved scalar multiplication are described. The method includes obtaining a bit-number of a scalar; factorizing the bit-number of the scalar into a product of a plurality of factors, the plurality of factors comprising s, d, and w; generating d tables based on a parameter, each table comprising N entries; for each iteration of s iterations: multiplying a result by two, constructing an index for each table from w bits in the scalar in the binary format, selecting a value from each table based on the constructed index for each table, and adding the value selected from each table to the result and starting next iteration; and in response to completing the s iterations, determining the result for a scalar multiplication between the scalar and the parameter.

20 Claims, 2 Drawing Sheets

(56) References Cited

OTHER PUBLICATIONS

Michael D. Ernst et al., "An Empirical Analysis of C Preprocessor Use", University of Washington, Department of Computer Science and Engineering, Jan. 18, 2000, 34p, US.

International Search Report and Written Opinion regarding PCT/US2023/063760 dated Sep. 21, 2023, 6 pages.

Islam et al., "Area-Time Efficient Hardware Implementation of Modular Multiplication for Elliptic Curve Cryptography," Published in: IEEE Access (vol. 8); pp. 73898-73906, Apr. 16, 2020, 9 pages.

Raiashree et al., "Elliptic Curve Scalar Multiplication over Prime Field for both Affine and Jacobian Coordinates," Published in: 2023 International Conference on Intelligent and Innovative Technologies in Computing, Electrical and Electronics (IITCEE), Date of Conference: Apr. 10, 2023, 2 pages.

* cited by examiner

INTERLEAVED SCALAR MULTIPLICATION FOR ELLIPTIC CURVE CRYPTOGRAPHY

FIELD OF THE TECHNOLOGY

The present disclosure relates to scalar multiplication, and in particular, to an interleaved scalar multiplication for elliptic curve cryptography.

BACKGROUND OF THE DISCLOSURE

Elliptic-curve cryptography (ECC) is one of the public-key based cryptographies, and is based on the algebraic structure of elliptic curves over finite fields. ECC may allow much smaller keys compared to some other non-EC public-key based cryptographies while providing equivalent security. Scalar multiplications between scalars and parameters (e.g., EC points) are computer-intensive and dominate execution time of ECC or some other cryptography operations. However, there are various issues/problems associated with the scalar multiplication methods, particularly for example but not limited to, low efficiency and/or less resistant to side-channel attacks.

The present disclosure describes various embodiments for performing interleaved scalar multiplication for elliptic curve cryptography, addressing at least one of the issues/problems discussed above. The present disclosure improves the technical field of public-key based cryptography, particularly ECC, with at least one of the following improvements: achieving high efficiency for computing scalar multiplications, reducing the execution times for computing scalar multiplications, enhancing resistant to many forms of side-channel attacks, increasing algorithm flexibility in response to hardware contains, and/or improving cybersecurity in term of data transmission and storage.

SUMMARY

The present disclosure describes various embodiments of methods, apparatus, and computer-readable storage medium for performing interleaved scalar multiplication for elliptic curve cryptography.

According to one aspect, an embodiment of the present disclosure provides a method for performing scalar multiplication between a scalar and a parameter. The method includes obtaining, by a device, a bit-number of a scalar, wherein the bit-number of the scalar is a number of bits in the scalar in a binary format. The device includes a memory storing instructions and a processor in communication with the memory. The method also includes factorizing, by the device, the bit-number of the scalar into a product of a plurality of factors, the plurality of factors comprising s, d, and w, wherein s, d, and w are positive integers; generating, by the device, d tables based on a parameter, each table comprising N entries, wherein N is a positive integer and a function of w; for each iteration of s iterations: multiplying, by the device, a result by two, constructing, by the device, an index for each table from w bits in the scalar in the binary format, selecting, by the device, a value from each table based on the constructed index for each table, and adding, by the device, the value selected from each table to the result and starting next iteration; and in response to completing the s iterations, determining, by the device, the result for a scalar multiplication between the scalar and the parameter.

According to another aspect, an embodiment of the present disclosure provides an apparatus for performing scalar multiplication between a scalar and a parameter. The apparatus includes a memory storing instructions; and a processor in communication with the memory. When the processor executes the instructions, the processor is configured to cause the apparatus to: obtain a bit-number of a scalar, wherein the bit-number of the scalar is a number of bits in the scalar in a binary format; factorize the bit-number of the scalar into a product of a plurality of factors, the plurality of factors comprising s, d, and w, wherein s, d, and w are positive integers; generate d tables based on a parameter, each table comprising N entries, wherein N is a positive integer and a function of w; for each iteration of s iterations: multiply a result by two, construct an index for each table from w bits in the scalar in the binary format, select a value from each table based on the constructed index for each table, and add the value selected from each table to the result and start next iteration; and in response to completing the s iterations, determine the result for a scalar multiplication between the scalar and the parameter.

In another aspect, an embodiment of the present disclosure provides a non-transitory computer readable storage medium storing instructions. When the instructions are executed by a processor, the instructions cause the processor to: obtain a bit-number of a scalar, wherein the bit-number of the scalar is a number of bits in the scalar in a binary format; factorize the bit-number of the scalar into a product of a plurality of factors, the plurality of factors comprising s, d, and w, wherein s, d, and w are positive integers; generate d tables based on a parameter, each table comprising N entries, wherein N is a positive integer and a function of w; for each iteration of s iterations: multiply a result by two, construct an index for each table from w bits in the scalar in the binary format, select a value from each table based on the constructed index for each table, and add the value selected from each table to the result and start next iteration; and in response to completing the s iterations, determine the result for a scalar multiplication between the scalar and the parameter.

The above and other aspects and their implementations are described in greater detail in the drawings, the descriptions, and the claims.

DETAILED DESCRIPTION OF THE DISCLOSURE

The invention will now be described in detail hereinafter with reference to the accompanied drawings, which form a part of the present invention, and which show, by way of illustration, specific examples of embodiments. Please note that the invention may, however, be embodied in a variety of different forms and, therefore, the covered or claimed subject matter is intended to be construed as not being limited to any of the embodiments to be set forth below. Please also note that the invention may be embodied as methods, devices, components, or systems. Accordingly, embodiments of the invention may, for example, take the form of hardware, software, firmware or any combination thereof.

Throughout the specification and claims, terms may have nuanced meanings suggested or implied in context beyond an explicitly stated meaning. The phrase "in one embodiment" or "in some embodiments" as used herein does not necessarily refer to the same embodiment and the phrase "in another embodiment" or "in other embodiments" as used herein does not necessarily refer to a different embodiment. Likewise, the phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments/implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Elliptic curve cryptography (ECC) is an approach to public-key cryptography based on the algebraic structure of elliptic curves over finite fields. Elliptic curves are applicable for key agreement, digital signatures, encryption, key transport and other schemes for general application within computer and communications systems.

ECC may allow much smaller keys compared to some other non-EC public-key based cryptographies while providing equivalent security. Using a smaller key size, ECC may reduce storage and transmission requirements. For example, Rivest-Shamir-Adleman (RSA) based cryptography is a widely used public-key cryptosystem for secure data transmission. In comparison to a popular RSA-based cryptography system with a large modulus and correspondingly larger key, ECC could provide the same level of security afforded by the RSA-based system with a much smaller key: for example, a 256-bit elliptic curve public key may provide comparable security to a 3072-bit RSA public key.

Scalar multiplications are compute-intensive and dominate the execution time of elliptic curve cryptographic operations. For example, when P is a point on an elliptic curve (E) of an order (N) and k is a positive integer, a multiplication between k and P may be defined as repeated addition of P by k times, i.e., k*P=P+P+ . . . +P (there are k Ps adding together). This multiplication operation may be called as elliptic curve scalar multiplication or elliptic curve point multiplication. In some implementations, P may include 2D coordinates (Px, Py), and thus, k*P may refer to k*(Px, Py)=(k*Px, k*Py). For scalar multiplication in ECC, one or both of k and P may be very large integer(s), which, for example, may be 256-bit or bigger integer(s).

Side-channel attacks on implementations of cryptosystems may include deriving secret information (e.g., private keys) by detecting (or measuring) at least one of the following: timing information, memory/cache storage/access information, or power consumption information. In elliptic curve cryptosystems, implementations of multiplication algorithms may be the primary targets for side-channel attacks.

There are various issues/problems associated with the scalar multiplication methods, particularly for example but not limited to, low efficiency and/or less resistant to side-channel attacks. The present disclosure describes various embodiments for performing interleaved scalar multiplication for elliptic curve cryptography, addressing at least one of the issues/problems discussed above. The present disclosure improves the technical field of public-key based cryptography, particularly ECC, with at least one of the following improvements: achieving high efficiency for computing scalar multiplications, reducing the execution times for computing scalar multiplications, enhancing resistant to many forms of side-channel attacks, increasing algorithm flexibility in response to hardware contains, and/or improving cybersecurity in term of data transmission and storage.

Various embodiments in the present disclosure describes methods for interleaved scalar multiplication, improving scalar multiplication algorithms in an elliptic curve cryptographic system. The operations based on various embodiments in the present disclosure may be more efficient than some other scalar multiplication algorithms and may be more resistant to side-channel attacks. As scalar multiplications are compute-intensive and dominate the execution time of elliptic curve cryptographic operations, the ECC system based on various embodiments in the present disclosure may increase performance and throughput of the ECC system, in comparison to other systems based on some other scalar multiplication algorithms.

In some implementations, a scalar k, which has n binary bits, may be represented as a n-bit binary number/integer, $(k_0, k_1, \ldots, k_{n-1})$, in a bit-level little-endian order, wherein $k_0$, is the least significant bit, and $k_{n-1}$ is the most significant bit.

In some implementations, scalar multiplications may be performed based on a binary expansion method. For example, the scalar multiplication operation may be expressed as the following algorithm, wherein the returned Q is the result for the scalar multiplication between k and P.

```
Q ← 0
for i from n–1 to 0 do
    Q ← 2*Q
    if k_i = 1 then
        Q ← Q + P
return Q
```

For n-bit scalar k, the complexity of binary expansion method is about n double operation and n/2 addition (on average, a half of bits of the scalar k is "1" and the other half of bits is "0"). When n is 256, the complexity is about 256 double and 128 additions.

In some implementations, scalar multiplication based on the binary expansion method may be vulnerable to side-channel attacks. For scalar multiplication based on the binary expansion method, given the fact that the addition of "Q+P" is only performed when the corresponding bit is "1" and the addition of "Q+P" is not performed when the corresponding bit is "0", secret information about bits of the scalar k may be extracted by monitoring a power consumption and/or a computing time duration.

In some implementations, scalar multiplications may be performed based on a Montgomery ladder method. For example, the scalar multiplication operation may be expressed as the following algorithm, wherein the returned $R_0$ is the result for the scalar multiplication between k and P.

```
R₀ ← 0
R₁ ← P
for i from n−1 to 0 do
    if kᵢ = 0 then
        R₁ ← R₀ + R₁
        R₀ ← 2R₀
    else
        R₀ ← R₀ + R₁
        R₁ ← 2R₁
return R₀
```

For n-bit scalar k, the complexity of the Montgomery ladder method is about n double operation and n addition. If n is 256, the complexity is about 256 double and 256 additions.

In some implementations, scalar multiplication based on the Montgomery ladder method may be inefficient. For scalar multiplication based on the Montgomery ladder method, an addition operation ("$R_0+R_1$") and a double operation ("$2R_0$" or "$2R_0$") are performed for each bit in the n-bit scalar k. Since the number of addition operation and double operation does not depend on the value of each bit in the n-bit scalar k, the Montgomery ladder approach computes the point multiplication in a fixed amount of time, which may be beneficial when timing or power consumption measurements are exposed to an attacker performing a side-channel attack.

In some implementations, scalar multiplications based on the Montgomery ladder method may be vulnerable to side-channel attacks based on information other than timing or power. For example, scalar multiplications based on the Montgomery ladder method may be vulnerable to memory based side-channel attacks (e.g., flush and/or reload of memory/cache).

In some implementations, scalar multiplications may be performed based on a windowed method, wherein a single table including pre-computed values is used. In the windowed method, a window size w is selected and a table including all $2^w$ values of $k_i*P$ is pre-computed for i=0, 1, 2, ..., $2^w-1$. The algorithm may use the representation $k=k_0+2^w k_1+2^{2w} k_2+ \ldots +2^{mw} k_m$, where m=n/w for n-bit integer K. For example, the scalar multiplication operation may be expressed as the following algorithm, wherein the returned Q is the result for the scalar multiplication between K and P.

```
Q ← 0
for i from m to 0 do
    for j from 0 to w do
        Q ← 2Q
    if kᵢ > 0 then
        Q ← Q + kᵢP  # kᵢP is pre-computed
return Q
```

In some implementations, the value of w in a windowed method may be chosen to be a small number so that the storage of the pre-computed values is in a reasonable size. For a non-limiting example, w=4 may be one of the best choices in practice. For n-bit scalar K, the complexity of windowed method is about n point double operations and at most n/w point addition operations.

In some implementations, scalar multiplication based on the windowed method may be vulnerable to side-channel attacks, given the fact that the point addition ("$Q+k_iP$") is not performed when the k is zero and the point addition ("$Q+k_iP$") is performed when the $k_i$>zero. Secret information about bits of the scalar k may be extracted by monitoring a power consumption and/or a computing time duration.

In some implementations, scalar multiplications may be performed based on a safe-select windowed method, which may have high resistant to the side-channel attacks. The safe-select windowed method may use a single table including pre-computed values. In the safe-select windowed method, a window size w is selected and a table including all $2^w$ values is pre-computed. The safe-select windowed method uses safe-select technologies. Safe-select is an implementation specific function to select the appropriate table entry without leaking information about the secret scalar. For example, by using safe-select, the scalar multiplication operation based on safe-select windowed method may be expressed as the following algorithm, wherein the returned Q is the result for the scalar multiplication between k and P.

```
Q ← 0
for i from m to 0 do
    for j from 0 to w do
        Q ← 2Q
    T = safe-select (kᵢ).  // the pre-computed kᵢP
    Q ← Q + T
return Q
```

In some implementations, for n-bit scalar K, the complexity of safe-select windowed method is about n point double operation and n/w point addition. For a non-limiting example, when n is 256 and w is 4, the complexity is about 256 double and 64 additions.

The present disclosure describes various embodiments for performing interleaved scalar multiplication program, which is an improved elliptic curve scalar multiplication algorithm. Various embodiments of interleaved scalar multiplication may be is more efficient than the basic binary expansion method and be more resistant to side-channel attacks. Various embodiments in the present disclosure may be easily implemented in software and/or hardware, increasing performance and throughput of systems that use elliptic curve cryptography.

Figure 1:
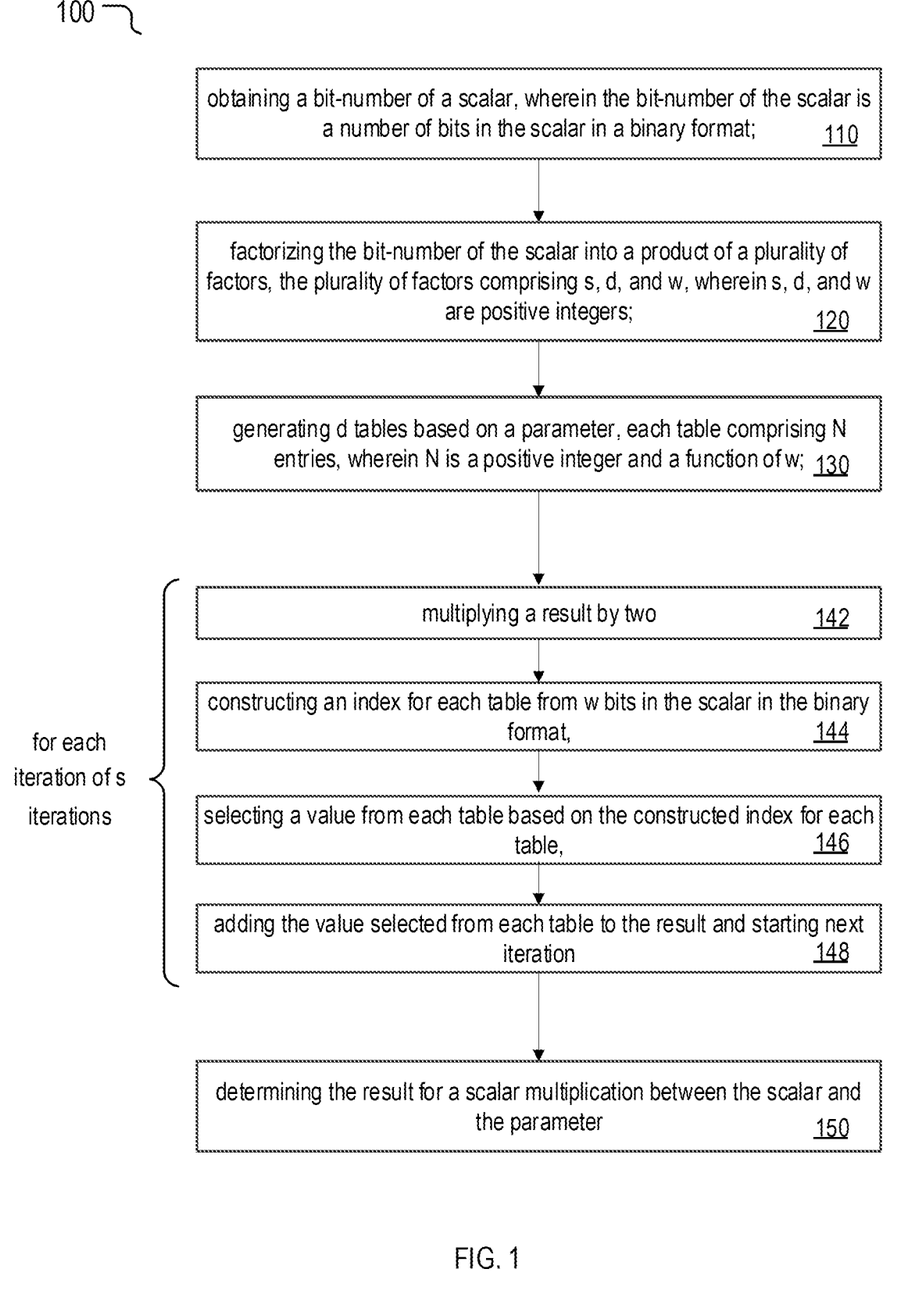
FIG. 1 is a flow diagram of an embodiment disclosed in the present disclosure.

FIG. 1 shows a flow diagram of a method 100 for performing interleaved scalar multiplication. The method 100 may include a portion or all of the following steps: step 110: obtaining a bit-number of a scalar, wherein the bit-number of the scalar is a number of bits in the scalar in a binary format; step 120: factorizing the bit-number of the scalar into a product of a plurality of factors, the plurality of factors comprising s, d, and w, wherein s, d, and w are positive integers; step 130: generating d tables based on a parameter, each table comprising N entries, wherein N is a positive integer and a function of w; for each iteration of s iterations: step 142: multiplying a result by two, step 144: constructing an index for each table from w bits in the scalar in the binary format, step 146: selecting a value from each table based on the constructed index for each table, and step 148: adding the value selected from each table to the result and starting next iteration; and/or step 150: in response to completing the s iterations, determining the result for a scalar multiplication between the scalar and the parameter.

In some implementations according to any one or any combination of the implementations or embodiments described in the present disclosure, N is equal to $2^w$.

In some implementations according to any one or any combination of the implementations or embodiments described in the present disclosure, an entry in the table with a table index of j is generated according to: $(b\_0+b\_1*2^64+ \ldots +b\_(w-1)*2^{((w-1)*d*s)})*2^{(j*s)}*P$, wherein $b\_0, b\_1, \ldots, b\_(w-1)$ are one-bit binary numbers, $\{b\_0, b\_1, \ldots, b\_(w-1)\}$ is an entry index for the entry, j is an integer between 0 and 3, inclusive, and P is the parameter.

In some implementations according to any one or any combination of the implementations or embodiments described in the present disclosure, the method 100 may further include, before starting a first iteration of the s iterations, setting the result as zero.

In some implementations according to any one or any combination of the implementations or embodiments described in the present disclosure, the scalar comprises n bits $\{k\_0, k\_1, \ldots, k\_(n-1)\}$ in a bit-level little-endian order, n being the bit-number of the scalar; i corresponds to an iteration index among the s iterations, i being an integer between 0 and (s−1), inclusive; and j corresponds to a table index among the d tables, j being an integer between 0 and (d−1), inclusive.

In some implementations according to any one or any combination of the implementations or embodiments described in the present disclosure, the constructing the index for each table from w bits in the scalar in the binary format comprises: constructing the index for each table from the w bits, $k\_(i+j*s+h*d*s)$, in the scalar in the bit-level little-endian order, h being an integer between 0 and (w−1), inclusive.

In some implementations according to any one or any combination of the implementations or embodiments described in the present disclosure, the constructed index comprises w bits of $\{k\_(i+j*s), k\_(i+j*s+d*s), \ldots, k\_(i+j*s+(w-1)*d*s)\}$.

In some implementations according to any one or any combination of the implementations or embodiments described in the present disclosure, the selecting the value from each table based on the constructed index for each table comprises: selecting the value from each table by a constant-time table look-up process based on the constructed index for each table.

In some implementations according to any one or any combination of the implementations or embodiments described in the present disclosure, in response to the bit-number of the scalar being 256, s is 16, d is 4, and w is 4; and an entry in the table with a table index of j is generated according to: $(b\_0+b\_1*2^64+b\_2*2^128+b\_3*2^192)*2^{(j*16)}*P$, wherein $b\_0, b\_1, b\_2$, and $b\_3$ are one-bit binary numbers, $\{b\_0, b\_1, b\_2, b\_3\}$ is an entry index for the entry, j being an integer between 0 and 3, inclusive, and P is the parameter.

In some implementations according to any one or any combination of the implementations or embodiments described in the present disclosure, an entry in a first table is generated according to $(b\_0+b\_1*2^64+b\_2*2^128+b\_3*2^192)*P$; an entry in a second table is generated according to $(b\_0+b\_1*2^64+b\_2*2^128+b\_3*2^192)*2^16*P$; an entry in a third table is generated according to $(b\_0+b\_1*2^64+b\_2*2^128+b\_3*2^192)*2^32*P$; and an entry in a fourth table is generated according to $(b\_0+b\_1*2^64+b\_2*2^128+b\_3*2^192)*2^48*P$.

In some implementations according to any one or any combination of the implementations or embodiments described in the present disclosure, in response to the bit-number of the scalar being 256, s is 16, d is 4, and w is 4; the scalar is represented by n bits $\{k\_0, k\_1, \ldots, k\_255\}$ in a bit-level little-endian order; i corresponds to an iteration index among the 16 iterations, i being an integer between 0 and 15, inclusive; j corresponds to a table index among the 4 tables, j being an integer between 0 and 3, inclusive; and the constructed index comprises 4 bits of $\{k\_(i+j*16), k\_(i+j*16+64), k\_(i+j*16+128), k\_(i+j*16+192)\}$.

In some implementations according to any one or any combination of the implementations or embodiments described in the present disclosure, in response to the bit-number of the scalar being 384, s is 24, d is 4, and w is 4.

In some implementations according to any one or any combination of the implementations or embodiments described in the present disclosure, in response to the bit-number of the scalar being 512, s is 32, d is 4, and w is 4.

In the present disclosure, a notation of "m^n" represents exponentiation operation, i.e, $m^n$, corresponding to the base m and the exponent or power n. For example, $2^128$ represents $2^{128}$, corresponding to 2 as the base and 128 as the exponent or the power.

Figure 2:
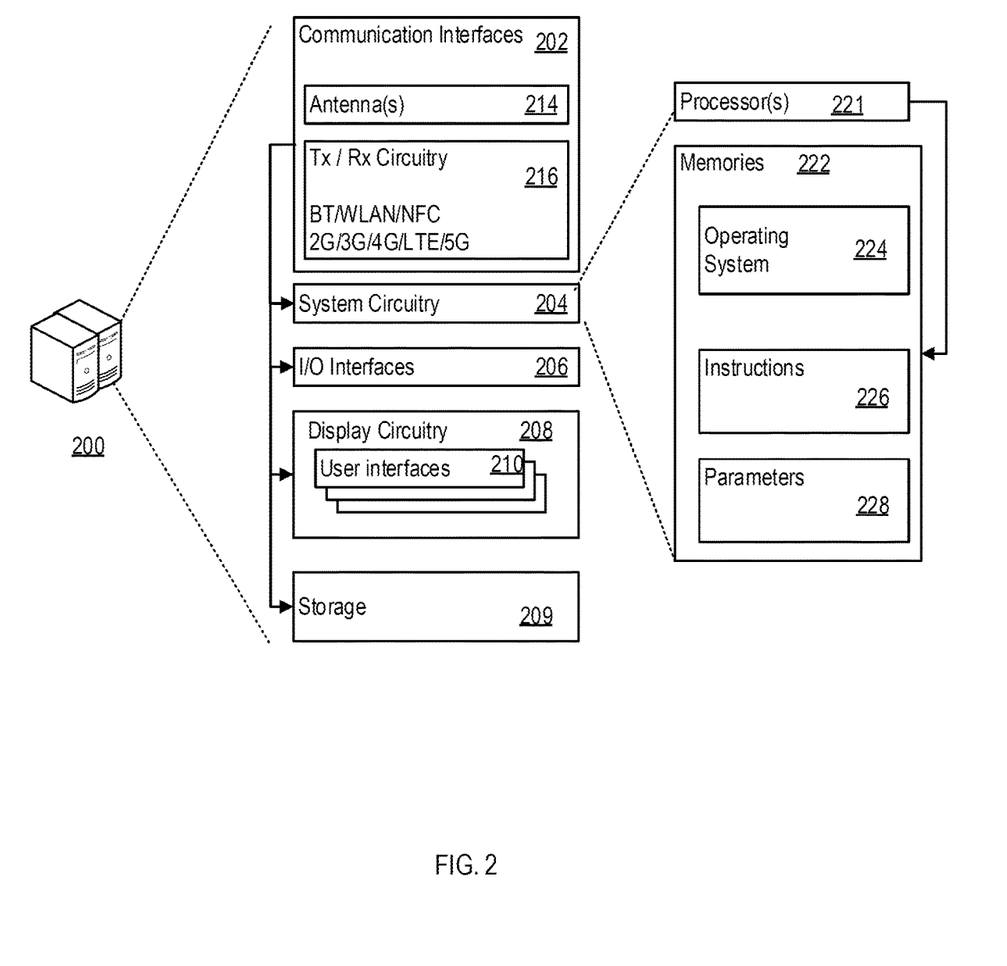
FIG. 2 is a schematic diagram of an electronic device disclosed in the present disclosure.

FIG. 2 shows an example of an electronic device 200 to implement one or more method described in the present disclosure. In one implementation, the electronic device 200 may be at least one of a computer, a server, a laptop, or a mobile device. In another implementation, the electronic device 200 may be a set of electronic devices comprising at least one of one or more computing server, one or more data server, one or more network server, one or more terminal, one or more laptop, and/or one or more mobile device.

The electronic device 200 may include communication interfaces 202, a system circuitry 204, an input/output interfaces (I/O) 206, a display circuitry 208, and a storage 209. The display circuitry may include a user interface 210. The system circuitry 204 may include any combination of hardware, software, firmware, or other logic/circuitry. The system circuitry 204 may be implemented, for example, with one or more systems on a chip (SoC), application specific integrated circuits (ASIC), discrete analog and digital circuits, and other circuitry. The system circuitry 204 may be a part of the implementation of any desired functionality in the electronic device 200. In that regard, the system circuitry 204 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 210. The user interface 210 and the inputs/output (I/O) interfaces 206 may include a graphical user interface, touch sensitive display, haptic feedback or other haptic output, voice or facial recognition inputs, buttons, switches, speakers and other user interface elements. Additional examples of the I/O interfaces 206 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 2, the communication interfaces 202 may include wireless transmitters and receivers ("transceivers") and any antennas used by the transmitting and receiving circuitry of the transceivers. The communication interfaces 202 may also include wireline transceivers, which may provide physical layer interfaces for any of a wide range of communication protocols, such as any type of Ethernet, data over cable service interface specification (DOCSIS), digital subscriber line (DSL), Synchronous Optical Network (SONET), or other protocol. The communication interfaces 202 may include a Radio Frequency (RF) transmit (Tx) and receive (Rx) circuitry 216 which handles transmission and reception of signals through one or more antennas 214. The communication interface 202 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 202 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

The system circuitry 204 may include hardware, software, firmware, or other circuitry in any combination. The system circuitry 204 may be implemented, for example, with one or more systems on a chip (SoC), application specific integrated circuits (ASIC), microprocessors, discrete analog and digital circuits, and other circuitry. For example referring to FIG. 2, the system circuitry 204 may include one or more processors 221 and memories 222. The memory 222 stores, for example, an operating system 224, instructions 226, and parameters 228. The processor 221 is configured to execute the instructions 226 to carry out desired functionality for the electronic device 200. The parameters 228 may provide and specify configuration and operating options for the instructions 226. The memory 222 may also store any BT, WiFi, 3G, 4G, 5G or other data that the electronic device 200 will send, or has received, through the communication interfaces 202. In various implementations, a system power for the electronic device 200 may be supplied by a power storage device, such as a battery or a transformer.

The storage 209 may be used to store various initial, intermediate, or final data. In one implementation, the storage 209 may be integral with a database server. The storage 209 may be centralized or distributed, and may be local or remote to the electronic device 200. For example, the storage 209 may be hosted remotely by a cloud computing service provider.

The present disclosure describes various embodiments, which may be implemented, partly or totally, on the one or more electronic device described in FIG. 2.

In some embodiments, an interleaved scalar multiplication method may be processed and implemented as the following.

A first step includes selecting proper decomposition factors for a given scalar size in bits. This may be achieved manually or automatically in a computer program.

A second step includes, according to the selected parameters, generating pre-computed resources for the interleaved scalar multiplication algorithm. This may be achieved automatically in a computer program.

A third step includes implementing the interleaved scalar multiplication algorithm, with the specific parameters and pre-computed resources. The detailed implementation of the interleaved scalar multiplication algorithm is described in the present disclosure.

A fourth step includes performing the computation for the specific scalar multiplication.

The scalar k may be represented as a n-bit integer, $(k_0, k_1, \ldots k_{n-1})$, in a bit-level little-endian order. The scalar multiplication operation may be expressed as follow for the binary representation: $k*P=P+P+ \ldots +P=k_0*P+k_1*2*P+ \ldots +k_{n-1}*2^{n-1}*P$.

In the present disclosure, merely to simply notation for clear expression, the multiplication symbol ("*") may be omitted in some formulas, for example, kP may refer to k*P, $k_{2s-1}2^sP$ may refer to $k_{2s-1}*2^s*P$, etc.

The bit length of the scalar k may be factorized/decomposed into a plurality of factors, which may be three factors, four factors, or five factors. For a non-limiting example, The bit length of the scalar k may be factorized/decomposed into three factors, and each factor is a positive small integer: n=s*d*w, wherein s is a sliding size, w is a window size, and d is a dimension size. The scalar multiplication operation may be expressed as follows for the binary representation:

$$k*P = \sum_{i=0}^{s-1} 2^i \sum_{j=0}^{d-1} \sum_{m=0}^{w-1} \left(k_{i+(md+j)s} 2^{(md+j)s} P\right)$$

The above formula may be expanded as the following.

$$kP = P + P + \ldots + P$$
$$= k_0 P + k_1 2P + \ldots + k_{n-1} 2^{n-1} P$$
$$= k_0 P + k_s 2^s P + \ldots + k_{n-s} 2^{n-s} P +$$
$$k_1 2P + k_{s+1} 2^{s+1} P + \ldots + k_{n-s+1} 2^{n-s+1} P +$$
$$\ldots$$
$$k_{s-1} 2^{s-1} P + k_{2s-1} 2^{2s-1} P + \ldots + k_{n-1} 2^{n-1} P$$
$$= 2^0 \left(k_0 P + k_s 2^s P + \ldots + k_{n-s} 2^{n-s} P\right) +$$
$$2^1 \left(k_1 P + k_{s+1} 2^s P + \ldots + k_{n-s+1} 2^{n-1} P\right) +$$
$$\ldots$$
$$2^{s-1} \left(k_{s-1} P + k_{2s-1} 2^s P + \ldots + k_{n-1} 2^{n-1} P\right)$$
$$= 2^0 N_0 + 2^1 N_1 + \ldots + 2^{s-1} N_{s-1}$$

The $N_i$ in the above formula may be expanded as the following, wherein i is smaller than s, and is larger than or equal to zero.

$$N_i = k_i P + k_{i+s} 2^s P + \ldots + k_{i+n-s} 2^{n-s} P$$
$$= k_i P + k_{i+ds} 2^{ds} P + \ldots + k_{i+(w-1)ds} 2^{(w-1)ds} P +$$
$$k_{i+s} 2^s P + k_{i+(d+1)s} 2^{(d+1)s} P + \ldots + k_{i+(w-1)ds+s} 2^{(w-1)ds+s} P +$$
$$\ldots$$

-continued $$k_{i+(d-1)s}2^{(d-1)s}P + k_{i+(2d-1)s}2^{(2d-1)s}P + \ldots + k_{i+n-s}2^{n-s}P$$
$$= W_{i0} + W_{i1} + \ldots + W_{i(d-1)}$$

The $W_{ij}$ in the above formula may be expanded as the following, wherein j is smaller than d, and is larger than or equal to zero.

$$W_{ij}=k_{i+js}2^{js}P+k_{i+js+ds}2^{js+ds}P+ \ldots + k_{i+js+(w-1)ds}2^{js+(w-1)ds}P$$

A plurality of tables including the $W_{ij}$ values may be pre-computed by combination different values of associated $k_i$ bits, the details of which are described in other part of the present disclosure.

With the parameters and pre-computed resources, the interleaved scalar multiplication may be expressed as the following algorithm, wherein the returned Q is the result for the scalar multiplication between k and P.

```
Q ← 0
for i from s−1 to 0 do
    Q ← 2Q
    for j from d−1 to 0 do
        v = { k_{i+js}, k_{i+js+ds}, ..., k_{i+js+(w-1)ds} }
        T = safe-select (j, v).        # the value of v in the
                                        # pre-computed table j.
        Q ← Q + T
return Q
```

For n-bit scalar k, the complexity of the interleaved method is about s point double operation and n/w point addition. In comparison to a safe-select windowed method, the point double computation complexity is reduced from n to s times. For a non-limiting example, when n is 256 and (s, d, w) are (16, 4, 4), respectively, the complexity of the interleaved method is about 16 double and 64 additions operations. In comparison to a safe-select windowed method, the point double computation complexity is reduced 16 times (i.e., from 256 double operations to 16 double operations). Table 1 shows an example of the reduction of the complexity for different scalar size.

TABLE 1

Reduction of computation complexity

| Scalar with n-bit size | n = 256 | n = 384 | n = 512 |
|---|---|---|---|
| safe-select windowed method (w = 4) | 256 Doubles + 64 Additions | 384 Doubles + 96 Additions | 512 Doubles + 128 Additions |
| interleaved method (w = 4, d = 4) | 16 Double + 64 Additions | 24 Doubles + 96 Additions | 32 Doubles + 128 Additions |

In some implementations, proper decomposition factors may be determined for a given scalar size in bits, and this determinization may be achieved manually or automatically in a computer program. For the given scalar length n, decomposing the length into small factors may depend on one or more other constrains. For one example, when a system has a large computing capability and limited memory, a larger sliding size (s) may be considered, so as to accommodate a smaller window size (w) and/or a smaller dimension size (d). For another example, when a system has no constrain on the memory (e.g., a sufficiently large memory size), a larger window size and/or a larger dimension size (d) may be determined, so as to result in a smaller sliding size to reduce computing time.

For non-limiting examples, Table 2 shows several selections for (s, w, d) for a scalar with different sizes. Usually, 4 may be a preferred choice for window size w and dimension size d.

TABLE 2

Examples of (s, w, d)

| Scalar with n-bit size | n = 256 | n = 384 | n = 512 |
|---|---|---|---|
| Sliding size (s) | 16 | 24 | 32 |
| Window size (w) | 4 | 4 | 4 |
| Dimension size (d) | 4 | 4 | 4 |

In some implementations, when the scalar length is decomposed into small factors, pre-computed tables including $W_{ij}$ values as entries may be generated according to the decomposed factors. This may be achieved automatically in a computer program. For the $W_{ij}$ values, the tables may be pre-computed by combination different values of associated $k_i$ bits for $\{2^{js}P, 2^{js+ds}P, \ldots, 2^{js+(w-1)ds}P\}$ according to the following.

$$W_{ij}=k_{i+js}2^{js}P+k_{i+js+ds}2^{js+ds}P+ \ldots + k_{i+js+(w-1)ds}2^{js+(w-1)ds}P$$

There may be d pre-computed tables. Each table contains $2^w$ elements/entries, and each entry in the table may be indexed by an index (or key) $\{k_{i+ns}, k_{i+js+ds}, \ldots, k_{i+js+(w-1)ds}\}$. The index has w-bit, and when each bit in the index takes all possible values of "0" or "1", there are $2^w$ indexes corresponding to the $2^w$ elements/entries in the table, respectively.

For a non-limiting example, when n is 256 and (s, d, w) is (16, 4, 4), there are 4 pre-computed tables, each table contains 16 elements/entries, and each entry is indexed by a 4-bit index value. Table 3 shows a first pre-computed table, which may also be labeled as table number (No.) 0 with j=0.

TABLE 3

First pre-computed table (j = 0)

| Index $\{k_{i+0}, k_{i+64}, k_{i+128}, k_{i+192}\}$ | Pre-computed value $W_{i0} = k_{i+0}P + k_{i+64}2^{64}P + k_{i+128}2^{128}P + k_{i+192}2^{192}P$ |
|---|---|
| {0, 0, 0, 0} | 0 |
| {1, 0, 0, 0} | P |
| {0, 1, 0, 0} | $2^{64}P$ |
| {1, 1, 0, 0} | $P + 2^{64}P$ |
| {0, 0, 1, 0} | $2^{128}P$ |
| {1, 0, 1, 0} | $P + 2^{128}P$ |
| {0, 1, 1, 0} | $2^{64}P + 2^{128}P$ |
| {1, 1, 1, 0} | $P + 2^{64}P + 2^{128}P$ |
| {0, 0, 0, 1} | $2^{192}P$ |
| {1, 0, 0, 1} | $P + 2^{192}P$ |
| {0, 1, 0, 1} | $2^{64}P + 2^{192}P$ |
| {1, 1, 0, 1} | $P + 2^{64}P + 2^{192}P$ |
| {0, 0, 1, 1} | $2^{128}P + 2^{192}P$ |
| {1, 0, 1, 1} | $P + 2^{128}P + 2^{192}P$ |
| {0, 1, 1, 1} | $2^{64}P + 2^{128}P + 2^{192}P$ |
| {1, 1, 1, 1} | $P + 2^{64}P + 2^{128}P + 2^{192}P$ |

Table 4 shows a second pre-computed table, which may also be labeled as table number (No.) 1 with j=1.

TABLE 4

| Second pre-computed table (j = 1) | |
|---|---|
| Index $\{k_{i+16}, k_{i+80}, k_{i+144}, k_{i+208}\}$ | Pre-computed value $W_{i1} = k_{i+16}2^{16}P + k_{i+80}2^{80}P + k_{i+144}2^{144}P + k_{i+208}2^{208}P$ |
| {0, 0, 0, 0} | 0 |
| {1, 0, 0, 0} | $2^{16}P$ |
| {0, 1, 0, 0} | $2^{80}P$ |
| {1, 1, 0, 0} | $2^{16}P + 2^{80}P$ |
| {0, 0, 1, 0} | $2^{144}P$ |
| {1, 0, 1, 0} | $2^{16}P + 2^{144}P$ |
| {0, 1, 1, 0} | $2^{80}P + 2^{144}P$ |
| {1, 1, 1, 0} | $2^{16}P + 2^{80}P + 2^{144}P$ |
| {0, 0, 0, 1} | $2^{208}P$ |
| {1, 0, 0, 1} | $2^{16}P + 2^{208}P$ |
| {0, 1, 0, 1} | $2^{80}P + 2^{208}P$ |
| {1, 1, 0, 1} | $2^{16}P + 2^{80}P + 2^{208}P$ |
| {0, 0, 1, 1} | $2^{128}P + 2^{208}P$ |
| {1, 0, 1, 1} | $2^{16}P + 2^{144}P + 2^{208}P$ |
| {0, 1, 1, 1} | $2^{80}P + 2^{144}P + 2^{208}P$ |
| {1, 1, 1, 1} | $2^{16}P + 2^{80}P + 2^{144}P + 2^{208}P$ |

Table 5 shows a third pre-computed table, which may also be labeled as table number (No.) 2 with j=2.

TABLE 5

| Third pre-computed table (j = 2) | |
|---|---|
| Index $\{k_{i+32}, k_{i+96}, k_{i+160}, k_{i+224}\}$ | Pre-computed value $W_{i2} = k_{i+32}2^{32}P + k_{i+96}2^{96}P + k_{i+160}2^{160}P + k_{i+224}2^{224}P$ |
| {0, 0, 0, 0} | 0 |
| {1, 0, 0, 0} | $2^{32}P$ |
| {0, 1, 0, 0} | $2^{96}P$ |
| {1, 1, 0, 0} | $2^{32}P + 2^{96}P$ |
| {0, 0, 1, 0} | $2^{160}P$ |
| {1, 0, 1, 0} | $2^{32}P + 2^{160}P$ |
| {0, 1, 1, 0} | $2^{96}P + 2^{160}P$ |
| {1, 1, 1, 0} | $2^{32}P + 2^{96}P + 2^{160}P$ |
| {0, 0, 0, 1} | $2^{224}P$ |
| {1, 0, 0, 1} | $2^{32}P + 2^{224}P$ |
| {0, 1, 0, 1} | $2^{96}P + 2^{224}P$ |
| {1, 1, 0, 1} | $2^{32}P + 2^{96}P + 2^{224}P$ |
| {0, 0, 1, 1} | $2^{160}P + 2^{224}P$ |
| {1, 0, 1, 1} | $2^{32}P + 2^{160}P + 2^{224}P$ |
| {0, 1, 1, 1} | $2^{96}P + 2^{160}P + 2^{224}P$ |
| {1, 1, 1, 1} | $2^{32}P + 2^{96}P + 2^{160}P + 2^{224}P$ |

Table 6 shows a fourth pre-computed table, which may also be labeled as table number (No.) 3 with j=3.

TABLE 6

| Fourth Pre-computed table (j = 3) | |
|---|---|
| Index $\{k_{i+48}, k_{i+112}, k_{i+176}, k_{i+240}\}$ | Pre-computed value $W_{i3} = k_{i+48}2^{48}P + k_{i+112}2^{112}P + k_{i+176}2^{176}P + ki_{+240}2^{240}P$ |
| {0, 0, 0, 0} | 0 |
| {1, 0, 0, 0} | $2^{48}P$ |
| {0, 1, 0, 0} | $2^{112}P$ |
| {1, 1, 0, 0} | $2^{48}P + 2^{112}P$ |
| {0, 0, 1, 0} | $2^{176}P$ |
| {1, 0, 1, 0} | $2^{48}P + 2^{176}P$ |
| {0, 1, 1, 0} | $2^{112}P + 2^{176}P$ |
| {1, 1, 1, 0} | $2^{48}P + 2^{112}P + 2^{176}P$ |
| {0, 0, 0, 1} | $2^{240}P$ |
| {1, 0, 0, 1} | $2^{48}P + 2^{240}P$ |
| {0, 1, 0, 1} | $2^{112}P + 2^{240}P$ |

TABLE 6-continued

| Fourth Pre-computed table (j = 3) | |
|---|---|
| Index $\{k_{i+48}, k_{i+112}, k_{i+176}, k_{i+240}\}$ | Pre-computed value $W_{i3} = k_{i+48}2^{48}P + k_{i+112}2^{112}P + k_{i+176}2^{176}P + ki_{+240}2^{240}P$ |
| {1, 1, 0, 1} | $2^{48}P + 2^{112}P + 2^{240}P$ |
| {0, 0, 1, 1} | $2^{176}P + 2^{240}P$ |
| {1, 0, 1, 1} | $2^{48}P + 2^{176}P + 2^{240}P$ |
| {0, 1, 1, 1} | $2^{112}P + 2^{176}P + 2^{240}P$ |
| {1, 1, 1, 1} | $2^{48}P + 2^{112}P + 2^{176}P + 2^{240}P$ |

In some implementations, for a given scalar k, the constructed indexes for looking up the tables may include secret information (e.g., information about the "0" and/or "1" of the bits in the given scalar). To increase side-channel attack resistant, table lookup may be performed in constant-time, using a safe-select algorithm. With constant-time table lookup algorithm, no secret information may be leaked by side-channel attack (e.g., by monitoring timing or power consumption).

In some implementations, after the decomposed factors are determined and pre-computed tables are generated for a given P, the interleaved scalar multiplication may be performed for a given a scalar.

In some implementations, when the scalar size is big and better performance is desired, the scalar size may be decomposed into more than three factors, and each factor is a small positive integer, for example, 4 factors, 5 factors, etc.

The present disclosure is not limited to expressing the scalar in a little-endian order, which is used to provide exemplary embodiments. In some other embodiments, the scalar may be expressed in a big-endian order, and the method for performing interleaved scalar multiplication may be performed following the similar patterns as described above in the present disclosure, for example, the tables and/or formulas have similar but different patterns.

The present disclosure provides a method, an apparatus, and a non-transitory computer readable storage medium for performing interleaved scalar multiplication. The present disclosure describes various embodiments to be more efficient than some other methods and be more resistant to side-channel attacks.

The present disclosure provides at least one of the following contributions: by properly decompose the scalar size, the interleaved scalar multiplication is more efficient than some other methods, for example, the basic binary expansion method and/or the safe-select windowed method; by using proper safe-select table algorithm, the interleaved scalar multiplication is side-channel attack resistant; by introducing the dimension size, the look-up table could be relative small, so that the safe-select table look-up may be more efficient; and/or the scalar size factors may be customized, so that an implementation with a good choice of the scalar size factors may accommodate and/or balance constrains of CPU and memory for the specific circumstance.

In the embodiments and implementation of this disclosure, any steps and/or operations may be combined or arranged in any amount or order, as desired. Two or more of the steps and/or operations may be performed in parallel. Embodiments and implementations in the disclosure may be used separately or combined in any order.

The techniques described above, may be implemented as computer software using computer-readable instructions and physically stored in one or more computer-readable media. For example, human accessible storage devices and their associated media include such as optical media including CD/DVD ROM/RW with CD/DVD or the like media, thumb-drive, removable hard drive or solid state drive, legacy magnetic media such as tape and floppy disc, specialized ROM/ASIC/PLD based devices such as security dongles, and the like. Those skilled in the art may also understand that term "computer readable media" as used in connection with the presently disclosed subject matter does not encompass transmission media, carrier waves, or other transitory signals.

While the particular invention has been described with reference to illustrative embodiments, this description is not meant to be limiting. Various modifications of the illustrative embodiments and additional embodiments of the invention will be apparent to one of ordinary skill in the art from this description. Those skilled in the art will readily recognize that these and various other modifications can be made to the exemplary embodiments, illustrated and described herein, without departing from the spirit and scope of the present invention. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

What is claimed is:

1. A method for performing scalar multiplication between a scalar and a parameter, the method comprising:
   obtaining, by a device comprising a memory storing instructions and a processor in communication with the memory, a bit-number of a scalar, wherein the bit-number of the scalar is a number of bits in the scalar in a binary format;
   factorizing, by the device, the bit-number of the scalar into a product of a plurality of factors, the plurality of factors comprising s, d, and w, wherein s, d, and w are positive integers;
   generating, by the device, d tables based on a parameter, each table comprising N entries, wherein N is a positive integer and a function of w;
   for each iteration of s iterations:
      multiplying, by the device, a result by two,
      constructing, by the device, an index for each table from w bits in the scalar in the binary format,
      selecting, by the device, a value from each table based on the constructed index for each table, and
      adding, by the device, the value selected from each table to the result and starting next iteration; and
   in response to completing the s iterations, determining, by the device, the result for a scalar multiplication between the scalar and the parameter.

2. The method according to claim 1, wherein:
   N is equal to $2^w$.

3. The method according to claim 1, wherein:
   an entry in the table with a table index of j is generated according to:
   $$(b\_0+b\_1*2^64+ \ldots +b\_(w-1)*2^{((w-1)*d*s))}*2^{(j*s)}*P,$$
   wherein b_0, b_1, ..., b_(w−1) are one-bit binary numbers, {b_0, b_1, ..., b_(w−1)} is an entry index for the entry, j is an integer between 0 and 3, inclusive, and P is the parameter.

4. The method according to claim 1, further comprising:
   before starting a first iteration of the s iterations, setting the result as zero.

5. The method according to claim 1, wherein:
   the scalar comprises n bits {k_0, k_1, ..., k_(n−1)} in a bit-level little-endian order, n being the bit-number of the scalar;
   i corresponds to an iteration index among the s iterations, i being an integer between 0 and (s−1), inclusive; and
   j corresponds to a table index among the d tables, j being an integer between 0 and (d−1), inclusive.

6. The method according to claim 5, wherein the constructing the index for each table from w bits in the scalar in the binary format comprises:
   constructing the index for each table from the w bits, k_(i+j*s+h*d*s), in the scalar in the bit-level little-endian order, h being an integer between 0 and (w−1), inclusive.

7. The method according to claim 5, wherein:
   the constructed index comprises w bits of
   $$\{k\_(i+j*s), k\_(i+j*s+d*s), \ldots, k\_(i+j*s+(w-1)*d*s)\}.$$

8. The method according to claim 5, wherein the selecting the value from each table based on the constructed index for each table comprises:
   selecting the value from each table by a constant-time table look-up process based on the constructed index for each table.

9. The method according to claim 1, wherein:
   in response to the bit-number of the scalar being 256, s is 16, d is 4, and w is 4; and
   an entry in the table with a table index of j is generated according to:
   $$(b\_0+b\_1*2^{64}+b\_2*2^{128}+b\_3*2^{192})*2^{(j*16)}*P,$$
   wherein b_0, b_1, b_2, and b_3 are one-bit binary numbers, {b_0, b_1, b_2, b_3} is an entry index for the entry, j being an integer between 0 and 3, inclusive, and P is the parameter.

10. The method according to claim 9, wherein:
    an entry in a first table is generated according to
    $$(b\_0+b\_1*2^{64}+b\_2*2^{128}+b\_3*2^{192})*P;$$
    an entry in a second table is generated according to
    $$(b\_0+b\_1*2^{64}+b\_2*2^{128}+b\_3*2^{192})*2^{16}*P;$$
    an entry in a third table is generated according to
    $$(b\_0+b\_1*2^{64}+b\_2*2^{128}+b\_3*2^{192})*2^{32}*P;\text{ and}$$
    an entry in a fourth table is generated according to
    $$(b\_0+b\_1*2^{64}+b\_2*2^{128}+b\_3*2^{192})*2^{48}*P.$$

11. The method according to claim 1, wherein:
    in response to the bit-number of the scalar being 256, s is 16, d is 4, and w is 4;
    the scalar is represented by n bits {k_0, k_1, ... k_255} in a bit-level little-endian order;
    i corresponds to an iteration index among the 16 iterations, i being an integer between 0 and 15, inclusive;
    j corresponds to a table index among the 4 tables, j being an integer between 0 and 3, inclusive; and
    the constructed index comprises 4 bits of
    $$\{k\_(i+j*16), k\_(i+j*16+64), k\_(i+j*16+128), k\_(i+j*16+192)\}.$$

12. The method according to claim 1, wherein:
    in response to the bit-number of the scalar being 384, s is 24, d is 4, and w is 4.

13. The method according to claim 1, wherein:
    in response to the bit-number of the scalar being 512, s is 32, d is 4, and w is 4.

14. An apparatus for performing scalar multiplication between a scalar and a parameter, the apparatus comprising:
a memory storing instructions; and
a processor in communication with the memory, wherein, when the processor executes the instructions, the processor is configured to cause the apparatus to:
obtain a bit-number of a scalar, wherein the bit-number of the scalar is a number of bits in the scalar in a binary format;
factorize the bit-number of the scalar into a product of a plurality of factors, the plurality of factors comprising s, d, and w, wherein s, d, and w are positive integers;
generate d tables based on a parameter, each table comprising N entries, wherein N is a positive integer and a function of w;
for each iteration of s iterations:
multiply a result by two,
construct an index for each table from w bits in the scalar in the binary format,
select a value from each table based on the constructed index for each table, and
add the value selected from each table to the result and start next iteration; and
in response to completing the s iterations, determine the result for a scalar multiplication between the scalar and the parameter.

15. The apparatus according to claim 14, wherein:
an entry in the table with a table index of j is generated according to:

$$(b\_0+b\_1*2^64+ \ldots +b\_(w-1)*2^{((w-1)*d*s)})*2^{(j*s)}*P,$$

wherein $b\_0, b\_1, \ldots, b\_(w-1)$ are one-bit binary numbers, $\{b\_0, b\_1, \ldots, b\_(w-1)\}$ is an entry index for the entry, j is an integer between 0 and 3, inclusive, and P is the parameter.

16. The apparatus according to claim 14, wherein:
the scalar comprises n bits $\{k\_0, k\_1, \ldots, k\_(n-1)\}$ in a bit-level little-endian order, n being the bit-number of the scalar;
i corresponds to an iteration index among the s iterations, i being an integer between 0 and (s−1), inclusive;
j corresponds to a table index among the d tables, j being an integer between 0 and (d−1), inclusive; and
the constructed index comprises w bits of $$\{k\_(i+j*s), k\_(i+j*s+d*s), \ldots, k\_(i+j*s+(w-1)*d*s)\}.$$

17. The apparatus according to claim 14, wherein:
in response to the bit-number of the scalar being 256, s is 16, d is 4, and w is 4; and
an entry in the table with a table index of j is generated according to:

$$(b\_0+b\_1*2^64+b\_2*2^128+b\_3*2^192)*2^{(j*16)}*P,$$

wherein $b\_0, b\_1, b\_2,$ and $b\_3$ are one-bit binary numbers, $\{b\_0, b\_1, b\_2, b\_3\}$ is an entry index for the entry, j being an integer between 0 and 3, inclusive, and P is the parameter.

18. A non-transitory computer readable storage medium storing instructions, wherein, when the instructions are executed by a processor, the instructions are configured to cause the processor to:
obtain a bit-number of a scalar, wherein the bit-number of the scalar is a number of bits in the scalar in a binary format;
factorize the bit-number of the scalar into a product of a plurality of factors, the plurality of factors comprising s, d, and w, wherein s, d, and w are positive integers;
generate d tables based on a parameter, each table comprising N entries, wherein N is a positive integer and a function of w;
for each iteration of s iterations:
multiply a result by two,
construct an index for each table from w bits in the scalar in the binary format,
select a value from each table based on the constructed index for each table, and
add the value selected from each table to the result and start next iteration; and
in response to completing the s iterations, determine the result for a scalar multiplication between the scalar and the parameter.

19. The non-transitory computer readable storage medium according to claim 18, wherein:
an entry in the table with a table index of j is generated according to:

$$(b\_0+b\_1*2^64+ \ldots +b\_(w-1)*2^{((w-1)*d*s)})*2^{(j*s)}*P,$$

wherein $b\_0, b\_1, \ldots, b\_(w-1)$ are one-bit binary numbers, $\{b\_0, b\_1, \ldots, b\_(w-1)\}$ is an entry index for the entry, j is an integer between 0 and 3, inclusive, and P is the parameter.

20. The non-transitory computer readable storage medium according to claim 18, wherein:
the scalar comprises n bits $\{k\_0, k\_1, \ldots, k\_(n-1)\}$ in a bit-level little-endian order, n being the bit-number of the scalar;
i corresponds to an iteration index among the s iterations, i being an integer between 0 and (s−1), inclusive;
j corresponds to a table index among the d tables, j being an integer between 0 and (d−1), inclusive; and
the constructed index comprises w bits of $$\{k\_(i+j*s), k\_(i+j*s+d*s), \ldots, k\_(i+j*s+(w-1)*d*s)\}.$$

* * * * *